Nov. 1, 1966     F. SOMMERFELD     3,283,041
APPARATUS AND METHOD FOR CONTROLLING PRESSURE
IN A PLASTIC EXTRUDING MACHINE
Filed May 9, 1963
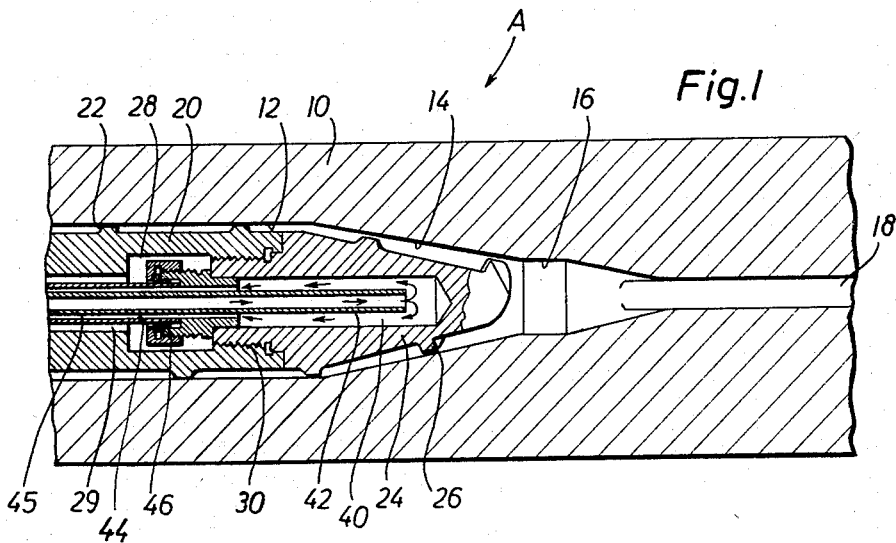
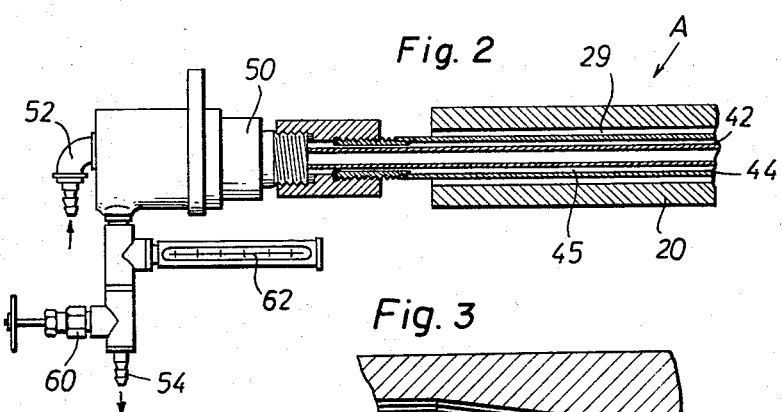
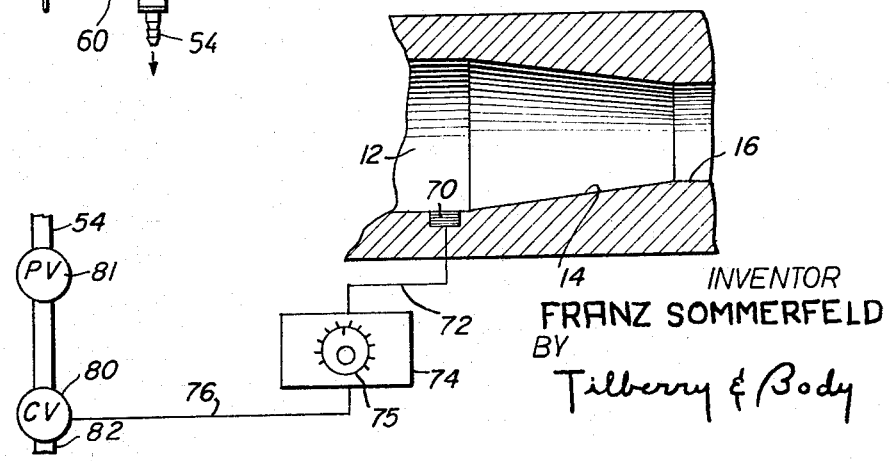
INVENTOR
FRANZ SOMMERFELD
BY
Tilberry & Body

United States Patent Office 3,283,041
Patented Nov. 1, 1966

3,283,041
APPARATUS AND METHOD FOR CONTROLLING PRESSURE IN A PLASTIC EXTRUDING MACHINE
Franz Sommerfeld, Frankfurterstr. 46, Porz-Wahn, Germany
Filed May 9, 1963, Ser. No. 279,126
Claims priority, application Germany, May 10, 1962, R 32,671
8 Claims. (Cl. 264—40)

The present invention pertains to the art of extruding plastic material and more particularly to an apparatus and method for controlling the pressure of a plastic material being extruded through a plastic extruding machine.

The present invention is particularly applicable for controlling the pressure of a plastic material passing through a plastic extruding machine of the type having a feed screw rotating in a cylindrical bore and the invention will be discussed with particular reference thereto; however, it is to be appreciated that the invention has somewhat broader applications and may be used in other similar plastic extruding machines.

In extruding a thermoplastic material through an extruding machine having a bore and a feed screw rotatably mounted therein, the quality of the resulting plastic extrusion is dependent on various operating factors. One of the most important factors which affects the quality of the extrusion is the hydraulic pressure on the thermoplastic material as it is being forced through the bore by the rotating feed screw. It is therefore important to control the hydraulic pressure on the thermoplastic material within the extruding machine. Accurate control of the pressure within the extruding machine is quite difficult and the hydraulic pressure must be changed in many instances when a different material is being extruded through the machine.

Many proposals have been suggested for allowing accurate control of the hydraulic pressure within an extruding machine; for instance, it has been proposed to provide a different feed screw to develop different pressures. This was somewhat successful; however, it required a substantial amount of time to change the feed screws and such an arrangement also necessitated a large supply of different feed screws which was expensive and consumed a substantial amount of storage space.

To alleviate the obvious problems concomitant with provision of separate feed screws for different pressures, it has been suggested to provide pressure increasing restriction blocks or restriction sieves at the outlet orifice of the extruding machine. Such restriction blocks or sieves had to be changed to vary the pressure of the material within the plastic extruding machine and this resulted in a considerable expense. In addition, the restriction blocks or sieves required joints between the extruding machine and the blocks or sieves which joints were quite susceptible to leakage which damaged the quality of the extrusion issuing from the nozzle. Also, when extruding a temperature sensitive thermoplastic material, the blocks or sieves created certain pockets or traps which held the material being extruded until it was overheated and, thus, deteriorated. Such difficulties in this type of an arrangement for creating a controlled back pressure within the extruding machine has prevented its successful adoption.

In an attempt to overcome the disadvantage of providing separate feed screws or providing the restriction blocks and sieves at the exit end of the extruding machine, it has been proposed to provide the feed screw with a conical surface and means for moving the feed screw axially so the conical surface on the end of the feed screw would coact with a conical surface at the end of the extrusion bore to restrict selectively the outlet passage of the machine. This caused a controlled amount of back pressure on the material being extruded through the extrusion machine; however, the means for adjusting the axial position of the feed screw was quite expensive and posed certain sealing problems at the sliding joint between the feed screw and the housing of the machine. In addition, the end of the feed screw, which is called the "nose," had to be smooth and could not carry an extension of the normal feed thread used to progress the material through the extruding machine. Accordingly, a certain amount of the extruding action was lost at the tip of the feed screw, which is actually the position at which a positive force is needed for moving the plastic material through the orifice of the extrusion machine.

In still a further attempt to correct this complicated problem of controlling the pressure within the extrusion machine, it was suggested to place a throttling valve on the nozzle of the machine; however, this valve created various pockets and irregular cavities wherein the plastic material could be held and overheated which would destroy the quality of the material being extruded.

In still a more sophisticated arrangement for controlling the pressure within the extrusion machine, it has been suggested to lower the temperature at the end of the bore adjacent the exit end of the machine. This was done by cooling the bore around the body of the feed screw and, thus, this arrangement removed a substantial portion of the feed screw from operation and cooled the area of the cylinder which performed the function of homogenizing the material preparatory to its final exit from the machine. Accordingly, when this portion of the bore was cooled, a back pressure was created on the material flowing through the bore; however, material was not properly mixed as it came from the extruding machine.

All of these disadvantages and others have been completely overcome by the present invention which is directed toward a method and apparatus for controlling the hydraulic pressure within the bore of a plastic extrusion machine which apparatus allows accurate control of the pressure without deleterious effects on the material being extruded therethrough.

In accordance with the present invention there is provided a method of controlling the pressure of plastic material flowing through an extruding machine having a central bore leading to an exit orifice and a feed screw having a body and a nose and rotating in the bore, the method comprises cooling the nose only with a fluid cooling medium in accordance with the desired pressure to be imparted in the plastic material.

In accordance with another aspect of the present invention, there is provided an improvement in an extruding apparatus comprising a casing having a cylindrical bore with one end gradually decreasing in size to an outlet orifice, a feed screw rotatably mounted in the bore with a generally conical nose extending toward the orifice, and means for rotating the feed screw to force a flowable plastic mass through the bore and out of the orifice. The improvement comprises a cooling chamber in the nose, an axial inlet passage through the screw and terminating in the chamber, an axial outlet passage through the screw and terminating in the chamber, a source of fluid cooling medium connected onto the inlet passage, means for forcing the medium through the chamber and means for controlling the temperature of the medium in the chamber in accordance with the desired pressure of the plastic mass flowing through the extrusion apparatus.

In accordance with still a further aspect of the present invention there is provided a method of controlling the pressure of plastic material flowing through an extruding machine having a central bore leading to an exit orifice and a feed screw having a body and a nose and rotating in the bore, the method comprising providing a cooling chamber in the nose, flowing a fluid medium through the chamber, sensing the deviation of the pressure of the plastic material in the bore, and controlling the rate of flow of the medium in response to the pressure deviation to maintain the pressure of the material at a predetermined value.

By constructing the extruding machine in accordance with the present invention, the temperature of the nose only is controlled independently of the rest of the feed screw in response to the necessary pressure within the rest of the bore. The feed screw itself, as well as the cylindrical bore remain active throughout their entire length since they are not cooled in accordance with the desired back pressure to be created by cooling the nose of the feed screw. In addition, the throttling effect of the cooled feed screw nose is considerably more intense than the previously mentioned procedure of lowering the temperature of the last portion of the cylindrical bore since it is possible, in accordance with the present invention, to create a considerable temperature differential between the nose and the last portion of the cylindrical bore which was not possible when this last portion was cooled. Further, in the case of thermoplastic materials which are sensitive to overheating, the present invention does not produce any pockets or cavities for trapping the material as it is being forced through the extruding machine and the material therefore does not deteriorate. Accordingly, the present invention makes it possible to control the temperature in that portion of the bore which is sloping from the bore proper to the outlet nozzle of the extrusion machine.

In accordance with the primary object of the present invention, there is provided an apparatus for controlling the pressure of a plastic material flowing through an extruding machine having a feed screw rotating in a cylindrical bore which apparatus accurately controls the pressure of the plastic material without a substantial increase in expense or a decrease in the quality of the material being extruded.

In accordance with another aspect of the present invention, there is provided an apparatus as defined above which apparatus controls the temperature of the plastic material adjacent only the exit end of the feed screw, which is called the nose, which causes a controlled back pressure on the material within the bore proper.

In accordance with still a further aspect of the present invention there is provided an apparatus as defined which does not cause an appreciable decrease in the temperature of the material in the bore proper and only decreases the temperature at the extreme end of the feed screw at the portion called the nose.

In accordance with another aspect of the present invention, there is provided a method of controlling the pressure of a plastic material flowing through an extruding machine having a feed screw rotating in a bore, which method includes cooling the material adjacent the extreme end of the feed screw independently of the material in the bore proper.

Yet another object of the present invention is the provision of a method as defined above wherein the cooling effect at the extreme end of the feed screw is controlled in response to the pressure of the material within the bore proper.

These and other objects and advantages will become apparent from the following description used to illustrate the preferred embodiments of the present invention as read in connection with the accompanying drawings in which:

FIGURE 1 is an enlarged, fragmentary, cross-sectional view illustrating the preferred embodiment of the present invention;

FIGURE 2 is a fragmentary, partially cross-sectioned side elevational view illustrating a further portion of the preferred embodiment as shown in FIGURE 1; and FIGURE 3 is a schematic view illustrating a slight modification of the preferred embodiment shown in FIGURES 1 and 2.

Referring now to the drawings, wherein the showings are for the purpose of illustrating preferred embodiments of the present invention only and not for the purpose of limiting same, FIGURES 1 and 2 show, fragmentarily, an extruding machine A for extruding the plastic material into the desired shape. The machine A comprises a casing 10 having a generally cylindrical bore 12 of considerable length to provide a mixing and heating chamber for the material passing through the machine and a conical end bore 14 having a gradually decreasing diameter for funneling the plastic material into an outlet passage 16 where it can be directed into a nozzle 18 for providing the material with the desired cross-sectional shape. Further, the machine A includes a feed screw 20 rotated within bore 12 by appropriate mechanism, not shown, which feed screw has on its external surface an appropriately positioned thread 22. The extreme end of the feed screw 20 terminates in a nose 24 having a generally conical outer surface substantially matching the surface of passage 14 and carrying nose thread 26 which is a continuation of thread 22 over the conical surface of the nose.

At the rear end of the nose there is provided a chamber 28 within the feed screw 20 which is at the terminal end of an axial passage 29 and provides a threaded coupling 30 for securing the nose onto the end of the screw 20. Within the nose 24, there is provided a cylindrically shaped cooling chamber 40 for receiving a fluid passing into the chamber from an inlet tube 42 and for directing the fluid into outlet passage 45 formed by tube 44 concentrically mounted with respect to tube 42. Accordingly, fluid can flow into the forward end of chamber 40 and then from the rear end of the chamber through the passage 45. In accordance with the illustrated embodiment of the present invention, there is provided an appropriate packing 46 for closing the rear end of chamber 40 and causing communication between tube 42 and passage 45 through the chamber 40.

Adjacent the rearwardmost end of rotating feed screw 20, there is provided a rotary coupling 50 which is common in the art and is not disclosed in detail, which coupling connects tube 42 to an inlet 52 and passage 45 to an inlet 54. By this arrangement, the inlet 52 and the outlet 54 are stationary while the tubes 42, 44 can be rotated with the feed screw 20. To control the rate of flow of fluid through chamber 40, there is provided a valve 60 in outlet 54 so that adjustment of the valve will create at least a minimum pressure on the fluid within chamber 40. The valve also controls the rate of flow of the fluid through the chamber. To indicate the temperature of the fluid flowing from outlet 54, there is provided a temperature sensing means, illustrated as a thermometer 62.

In accordance with the present invention, a source of fluid cooling medium, such as water or air, is connected onto inlet 52 and the medium is under a sufficient pressure to cause flow of fluid through the tube 42 into chamber 40 where it is in heat exchanging contact wth nose 24 to absorb heat energy from the materal flowing through the conical passage 14. After absorbing heat while in chamber 40, the fluid medium flows through passage 45 and exits at outlet 54. The absorption of heat energy from the material flowing through passage 14 causes back pressure on the material being forced by threads 22 through bore 12 and the amount of heat being absorbed accurately controls the amount of back pressure being created. To change the amount of heat being absorbed, the valve 60 can be adjusted to increase or decrease the rate of flow of the cooling medium through the chamber 40.

Since it is extremely deleterious to the operation of the extrusion apparatus A to have cooled portions along the feed screw 20, the cooling medium flowing through passage 45 is insulated from the screw 20 by air or other mediums within passage 29 and chamber 28. Accordingly, the cooling medium within chamber 40 cools only nose 24 and does not cool the active portion of the feed screw 20. The material on which the back pressure is being exerted is not subjected to cooled portions that could prevent homogenous mixing of the material flowing through bore 12.

In accordance with this embodiment of the present invention, there are provided two concentrically placed axially extending tubes within the feed screw 20 and terminating in a cooling chamber at the nose 24. This does not affect the normal cooling of the feed screw which can be incorporated within passage 29 if desired. And it is appreciated that any cooling of the feed screw proper is completely separate from the cooling of the nose 24 so that any increase in cooling effect at the nose 24 does not appreciably affect the normal cooling operation of the feed screw proper.

It is noted that the nose 24 can still have threads 26 which threads assist in forcing the material through the conical passage 14 and also provide increased area to enhance the heat exchange characteristics between the cooling medium chamber 40 and the external surface of nose 24.

The provision of the control valve 60 allows a certain amount of pressure to be maintained on the cooling medium flowing through chamber 40 so that any liquid used as a cooling medium will not tend to boil and cause detrimental vapor pockets.

Referring now to FIGURE 3, there is illustrated a slight modification of the preferred embodiment as disclosed in FIGURES 1 and 2 wherein there is incorporated an arrangement whereby the pressure of the material flowing through bore 12 can be sensed and a signal generated, which signal will cause a corrective change in the fluid flow through chamber 40 in response to deviations in the pressure of the material flowing through the bore 12. In accordance with this modification, there is included a pressure transducer 70 for sensing the pressure of the plastic material within bore 12 and which pressure transducer is connected by line 72 onto an appropriate control means 74. Accordingly, the signal directed to the control means 74 corresponds with the back pressure caused by the cooling effect at the nose 24. Within means 74, there is provided any appropriate arrangement whereby a dial 75 can be set at the desired pressure so that the means 74 can determine whether the signal emanating from transducer 70 indicates a deviation of pressure below or above the desired pressure to be maintained within the bore 12. Accordingly, the means 74 through line 76 controls the valve 80 either to increase or decrease the rate of flow of cooling medium through chamber 40 as dictated by the change in pressure within bore 12 as sensed by transducer 70. To maintain a preselected minimum pressure on the cooling system, there is provided a pressure valve 81. The flow of cooling medium from chamber 40 passes from outlet 54 through valve 81 and valve 80 to the discharge passage 82.

In operation, the dial 75 is set on control means 74 to the desired pressure to be maintained within the bore 12 and any deviation in pressure within the bore will be sensed by the transducer 70 and a corrective throttling of the cooling medium will occur at valve 80.

The present invention has been discussed with particular emphasis on certain structural embodiments; however, it is appreciated that various structural changes may be made without departing from the intended spirit and scope of the present invention as defined in the appended claims.

Having thus described my invention, I claim:

1. A method of controlling the pressure of plastic material flowing through an extruding machine having a cylindrical bore leading to an exit orifice and a feed screw having a body and a nose and rotating in said bore, the method comprising the following steps: cooling said nose only, with a fluid cooling medium flowing in a chamber in heat exchange relationship with said bore, sensing the deviation of the pressure of said plastic material in said bore with respect to a predetermined pressure, and controlling the flow of said cooling medium in accordance with said deviation to maintain the pressure desired to be imparted to said plastic material in said bore and adjacent said exit orifice.

2. A method of controlling the pressure of plastic material flowing through an extruding machine having a cylindrical bore leading to an exit orifice and a feed screw having a body and a nose and rotating in said bore, the method comprising the following steps: providing a cooling chamber adjacent said nose, flowing a fluid cooling medium through said chamber, insulating said body of said screw from said chamber and said cooling fluid, sensing the deviation of the pressure of said plastic material in said bore with respect to a predetermined pressure, and controlling the flow of said cooling medium in said chamber in accordance with said deviation to maintain the pressure desired to be imparted to said plastic material in said bore and adjacent said exit orifice.

3. A method of controlling the pressure of plastic material flowing through an extruding machine having a cylindrical bore leading to an exit orifice and a feed screw having a body and a nose and rotating in said bore, the method comprising the following steps: providing a cooling chamber adjacent said nose, flowing a fluid cooling medium through said chamber, sensing the deviation of the pressure of said plastic material in said bore with respect to a predetermined pressure, and controlling the flow of said medium in response to said deviation to maintain the pressure of said material at a predetermined value.

4. A method of controlling the pressure of a plastic material flowing through an extruding machine having a cylindrical bore leading to an exit orifice and a feed screw having a body and a nose and rotating in said bore, the method comprising the following steps: cooling the nose independently of the rest of said feed screw by flowing a cooling medium adjacent said nose, sensing the deviation of the pressure of said plastic material in said bore with respect to a predetermined pressure and changing the flow of said cooling medium in accordance with said deviation to maintain the pressure desired of the material in said bore and adjacent said nose.

5. A method of controlling the pressure of plastic material flowing through an extruding machine having a cylindrical bore leading to an exit orifice and a feed screw having a body and a nose and rotating in said bore, the method comprising the following steps: cooling the nose independently of the rest of said feed screw by flowing a cooling medium adjacent said nose, sensing the deviation of the pressure of said plastic material in said bore with respect to a predetermined pressure and changing the flow of said cooling medium in response to a change in pressure of the material within said bore and adjacent said nose.

6. In an extruding apparatus comprising a casing having a cylindrical bore with one end gradually decreasing in size to an outlet orifice, a feed screw rotatably mounted in said bore with a generally conical nose extending toward said orifice, and means for rotating the feed screw to force a flowable plastic mass through said bore and out of said orifice, the improvement comprising: a means for cooling said nose independently of the rest of said feed screw, means for sensing the deviation of pressure of said material in said bore from a desired pressure, and control means for changing the cooling effect of said cooling means in accordance with said deviation.

7. In an extruding apparatus comprising a casing having a cylindrical bore with one end gradually decreasing in size to an outlet orifice, a feed screw rotatably mounted in said bore with a generally conical nose extending toward said orifice, and means for rotating the feed screw to force a flowable plastic mass through said bore and out of said orifice, the improvement comprising: a cooling chamber in said nose, an axial inlet passage through said screw and terminating in said chamber, a pressurized source of fluid cooling medium connected onto said inlet passage, and means for controlling the temperature of said medium in said chamber in accordance with the desired pressure of said plastic mass flowing through said apparatus.

8. The improvement as defined in claim 7 wherein said controlling means includes an adjustable valve in said outlet passage.

References Cited by the Examiner
UNITED STATES PATENTS

| 2,653,348 | 9/1953 | Elgin et al. | 18—12 |
| 2,722,716 | 11/1955 | Henning | 18—12 |

ROBERT F. WHITE, *Primary Examiner.*

S. A. HELLER, *Assistant Examiner.*